Dec. 22, 1931.      L. DE FLOREZ      1,837,853
PYROMETRIC DEVICE
Filed Oct. 19, 1927
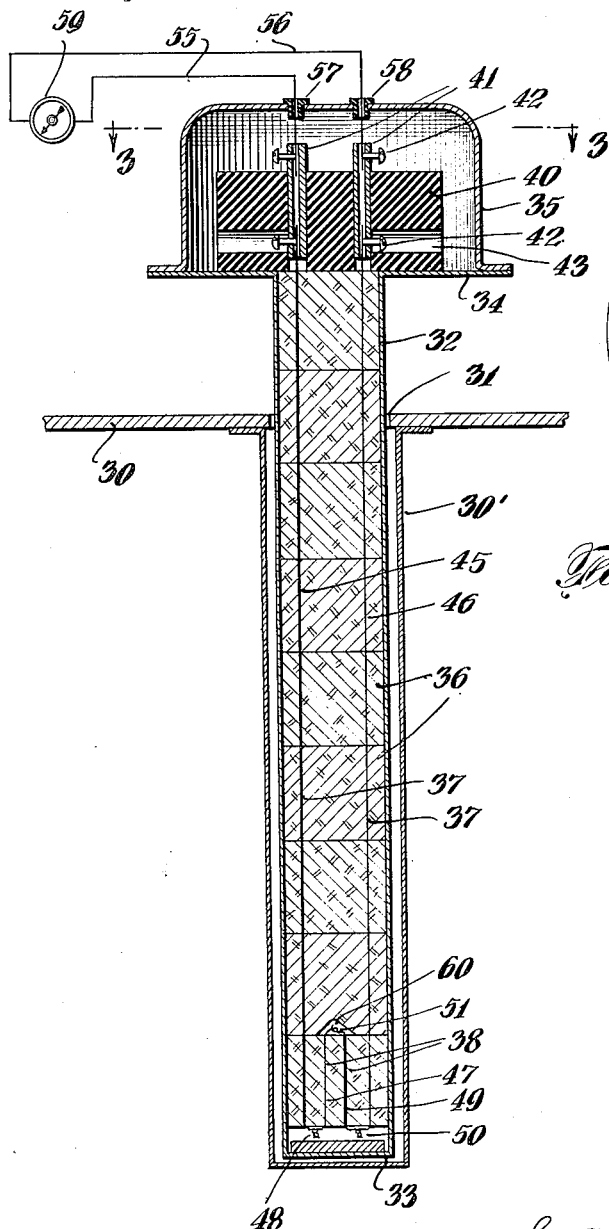
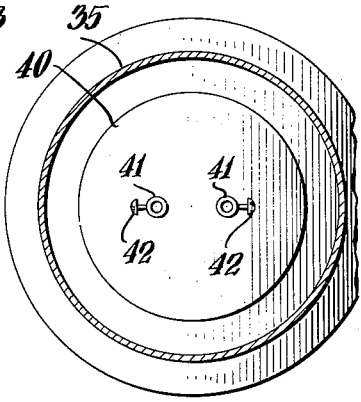
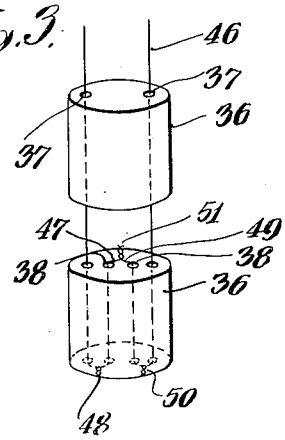
Inventor
Luis de Florez
By his Attorneys
Hogart & Meany Patented Dec. 22, 1931

1,837,853

UNITED STATES PATENT OFFICE

LUIS DE FLOREZ, OF POMFRET, CONNECTICUT

PYROMETRIC DEVICE

Application filed October 19, 1927. Serial No. 227,345.

The present invention relates to apparatus responsive to physical changes in an adjacent system, and adapted to be used for the purpose of indicating, recording or controlling said changes. More specifically, the invention comprises means for the indication of temperature changes in a system simultaneously with their occurrence, in such a manner as to indicate primarily the relative rate at which such changes are occurring, and secondarily, the true value of the temperature in the adjacent system when said system is in a state of equilibrium.

The practice with regard to indicating, recording or controlling temperatures in conduits, furnaces and analogous apparatus has been to depend on the true, or approximately true, value of the temperature at which the indicating or controlling instrument responds. The function of the present invention is to modify the responsive action of the instrument employed for indicating, recording or controlling temperatures, to obtain an exaggerated or amplified response. The modified response is dependent on the rate of temperature change, the response being more distorted for rapid changes than for slow changes. In controlling some types of furnaces, for instance, it is desirable to prevent too great an increase of temperature. A sudden increase of temperature quite frequently carries the temperature beyond the desired working limit in spite of the effective methods now employed for controlling temperature rise. This is perhaps due to the fact that the "impetus" of the sudden change prevents the responsive control instrument from functioning until the working limit has been exceeded, at which time the temperature is still increasing at a rapid rate and rises beyond the desired limit before it is checked. The converse is, of course, true with respect to sudden drop in temperature. By providing means for distorting the responsive action of the controlling device, sudden rises or drops in temperature are anticipated and controlled before the predetermined value at which it is desired to control the temperature is reached.

As examples of the applications to which my invention may be made, one form of the apparatus comprises a temperature indicating or controlling device, which is influenced either directly or indirectly by temperature and the rate of change in temperature. Most types of indicators give direct indications of the temperature in the heater or other apparatus at the points at which they are inserted. When the temperature of the apparatus is static, the instrument will indicate the true physical condition existing at this point if it is properly calibrated. It is an object of the present invention to provide an instrument capable of indicating or controlling temperature changes and having means dependent on the rate of temperature change for modifying the response of the instrument. It is a further object of the invention to provide a device which functions to an exaggerated degree to respond very rapidly with respect to the rate of temperature change.

Referring to the accompanying drawings, which form a part of this specification, and in which like reference characters denote like parts throughout the several views thereof, Figure 1 is a central vertical section through a thermo-couple constructed according to my invention and showing diagrammatically the customary galvanometer connected thereto.

Figure 2 is a cross section taken on the line 3—3 of Figure 2; and

Figure 3 is a perspective view of a portion of the couple showing the construction of two hot junctions and a cold or intermediate junction in more detail.

An embodiment of the invention, employing a well known type of pyrometer, is illustrated in Figures 1, 2 and 3. This type of pyrometer usually consists of two wires of dissimilar metals joined together at their extremities and with the other ends connected to a galvanometer or other indicating or recording instrument, the joined ends of the two wires forming what is known as the hot junction, and the ends connected to the indicating instrument, the cold junction. The latter junction is usually provided with compensating means to offset changes in room temperature. The temperature difference between these terminals of the dissimilar wires sets up an electromotive force which is proportional to this difference in temperature, causing a corresponding deflection of the galvanometer which is usually directly calibrated in temperature degrees.

I have discovered that it is possible to cause an indicating device of this character to distort the indicated temperature during a change in temperature and to reflect a temperature different from the true temperature of the material at any given instant during a change, and this departure from the true temperature may be made proportional to the rate at which the temperature of the given point is changing, thus giving an indication which it itself exaggerated but which gives warning of the direction and probable extent of the departure from the desired conditions, and enabling the furnace operator to apply his corrections more accurately and more quickly.

Referring to Figure 1 it will be seen that a chamber or conduit, a section of the wall of which is indicated at 30, is provided with an aperture 31 through which the thermo-couple casing 32 is inserted in a well 30' in the chamber or conduit. The casing 32 is closed at its lower end by a wall 33 and is provided with a flange 34 at its upper or outer end. The flange 34 supports a shell or cover 35 which serves to completely enclose the couple. The casing 32 is preferably cylindrical in shape and contains a plurality of cylindrical porcelain insulating blocks 36 which rest one upon the other in the casing. The blocks 36 are each provided with a pair of longitudinal apertures 37, through which pass the wires forming the thermo-couple proper. The lower block of the series is provided with two additional apertures 38 as shown most clearly in Figure 3. An insulating block 40 is mounted inside of the cover 35 and rests upon the flange 34 of the casing 32. This block carries two conduction vertical sleeves 41, each insulated from the other, and each provided with two set screws 42 which serve to clamp the connecting wires within the sleeves 41. The lowermost screws 42 are made accessible by apertures 43 cut in the block 40. A wire 45 is inserted in one series of apertures 37 and a wire 46 of dissimilar thermo-electric characteristics is threaded through the other series of apertures 37. The wires 45 and 46 may be of any of the usual metals employed in thermo-couples, for example, the wire 45 may be made of iron and the wire 46 of constantan or other alloy. The wire 45 is joined at its lower end to a wire 47 of the same character as the wire 46, forming a junction 48, and the wire 46 is joined at its lower end to a wire 49 of the same character as the wire 45, forming a junction 50. The wires 47 and 49 extend upwardly through the apertures 38 of the lowermost block 36 and at the top of this block are joined together to form an intermediate junction 51.

The upper ends of the wires 45 and 46 are secured in the lower ends of the sleeves 41 by means of the lower set screws 42. The upper set screws 42 serve as terminals for wires 55 and 56 leading through insulators 57 and 58 in the cover 35 to a galvanometer or other indicating, recording or controlling device 59.

On the under side of the insulating block adjacent the intermediate junction 51 a recess 60 is provided. The junction 51 is therefore surrounded by an insulating material and will consequently be shielded from the direct heat affecting the junctions 48 and 50. However, by selecting a suitable insulation with known conductivity, the temperature of the junction 51 will rise or fall with changes in the temperature of the junctions 48 and 50, but the rate of change of temperature of the intermediate insulated junction is less than that of the hot junctions exposed directly to the heat.

It will therefore be observed that so long as there is a difference in temperature between the junction 51 and the two junctions 48 and 50 the effective E. M. F. impressed on the indicating galvanometer will be the sum of the E. M. F.'s of the two thermo-couples, there being two hot junctions and two cold junctions. As the temperature of the junction 51 approaches that of the junctions 48 and 50, the combined effect of the two thermo-couples disappears and when the temperature of all of the junctions 48, 50 and 51 are equal, that is, when the device is static, the E. M. F. acting on the galvanometer will be that produced by a single thermo-couple. By employing two or more thermo-couples in series it is obvious that the added E. M. F.'s will cause a distorted action of the galvanometer. In other words, if the intermediate junction is cold and a sudden rise in temperature occurs, a substantially double value of the temperature rise will be indicated. If the rise is gradual the intermediate junction warms up more nearly at the rate of temperature rise of the hot junctions and the indication of temperature may be only slightly above that of the true temperature. In this way the temperature of the intermediate junction at any instant is dependent upon the rate of change of temperature of the hot junctions, as well as upon the existing static temperature condition. Similarly, upon a decrease in temperature, the intermediate junction will lose its heat more slowly than the two hot junctions due to the impedance, preferably heat insulation surrounding it. It will be apparent that the potential produced at the cold junction will be dependent not only upon the true temperature of the hot junctions but upon the rate at which this temperature is rising or falling. The galvanometer or other indicating device should normally be calibrated so that its readings will be readings of the true temperatures of the hot junctions when equilibrium conditions have been reached, that is to say, when the temperature differential between the intermediate junction and the two hot junctions has become zero.

It will thus be apparent that when the conditions in the furnace are static the galvanometer will indicate the true temperature of the point at which the thermo-couple is inserted; that when the temperature of the hot junctions is rising or falling the galvanometer will indicate a higher or lower temperature which will depart from the true temperature of the hot junctions by an amount which is dependent upon the rate of rise or fall of the temperature of the hot junctions. The furnace operator is therefore given immediate warning that a change is taking place and advance indication of the extent of seriousness and direction of the departure from the desired condition, and is therefore enabled to regulate his furnace and maintain the temperature at the desired value much more accurately and more readily. It will be obvious also that the galvanometer may be suitably connected with any desired variety of automatic control, thus obtaining the same benefits as have been pointed out in the foregoing in regard to the manual control of the furnace conditions.

Thermo-electric pyrometers normally are used to indicate instantaneous values of the actual temperature obtaining in the measured temperature zone. Some special modifications have been provided which operate to indicate conditions of changing temperature in the zone under measurement, but which are not thermo-electrically responsive to constant temperature conditions. In the present invention a device is provided which performs both of the aforesaid functions, namely, the indication of constant temperature conditions and the indication of changing temperature conditions. My device also represents a further improvement in the art in that indication thereby of a changing temperature is proportionate to the rate of such change as contrasted with prior devices which merely react to sudden changes of a substantial magnitude. Thus, the pyrometric device embodied in my invention may be conveniently designated as a multiple effect pyrometer since several desirable operative functions are performed thereby.

Wherever the term multiple effect pyrometer is used in the appended claims it is intended that such term shall designate a pyrometric device capable of thermo-electric response to temperature and temperature changes such that the use of the device is not limited to the indication of actual instantaneous temperature values or to indication of temperature changes and the rate thereof.

While a specific embodiment of the present invention is shown in the accompanying drawings and described hereinbefore, it is to be clearly understood that undue limitation either as to form or industrial application is not intended thereby. Thus in the specific embodiment shown in Figure 1 of the attached drawings the number of thermo-couple junctions placed in the measured temperature zone is not limited to the three junctions shown in the said figure. It may sometimes be desirable to occasion a greater degree of exaggeration in the indicated temperature values during periods of temperature change, and, in such instances, the desired object may be attained by proportionately increasing the number of hot and intermediate junctions.

I claim:

1. A pyrometric device which comprises an odd number of thermo-couples connected in series, said device having an odd number of thermo-electric junctions located in the same temperature measurement zone and a cold junction located outside of said zone, said thermo-electric junctions consisting of hot junctions and of intermediate junctions, the latter being one less in number than said hot junctions and being completely surrounded with thermal insulation.

2. An apparatus comprising a multiple effect pyrometer adapted to indicate both actual instantaneous temperature values and rates of temperature change and an instrument responsive to electric current impulses connected thereto, said pyrometer comprising an odd number of thermo-couples connected in series and having three thermo-electric junctions located in the same temperature measurement zone and a single remote cold junction located in said instrument, said three thermo-electric junctions consisting of two hot junctions and one intermediate junction spaced from said hot junctions, said intermediate junction being completely surrounded with thermal insulation.

In testimony whereof, I have signed my name to this specification this 13th day of October, 1927.

LUIS DE FLOREZ.